United States Patent
Liu et al.

(10) Patent No.: US 10,197,834 B2
(45) Date of Patent: Feb. 5, 2019

(54) CURVED-SURFACE BACKLIGHT SOURCE AND DISPLAY DEVICE

(71) Applicant: BOE TECHNOLOGY GROUP CO., LTD., Beijing (CN)

(72) Inventors: Qing Liu, Beijing (CN); Zhongbao Wu, Beijing (CN); Zezhou Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/539,208

(22) PCT Filed: May 23, 2016

(86) PCT No.: PCT/CN2016/082960
§ 371 (c)(1),
(2) Date: Jun. 23, 2017

(87) PCT Pub. No.: WO2017/161663
PCT Pub. Date: Sep. 28, 2017

(65) Prior Publication Data
US 2018/0046015 A1   Feb. 15, 2018

(30) Foreign Application Priority Data

Mar. 24, 2016 (CN) .......................... 2016 1 0173896

(51) Int. Cl.
*G02F 1/1333*   (2006.01)
*G02B 6/00*   (2006.01)
*G02F 1/1335*   (2006.01)

(52) U.S. Cl.
CPC ......... *G02F 1/133308* (2013.01); *G02B 6/00* (2013.01); *G02F 1/133305* (2013.01);
(Continued)

(58) Field of Classification Search
CPC ......... G02F 1/133308; G02F 1/133305; G02F 1/133603; G02F 2001/133612; G02B 6/00
(Continued)

(56) References Cited

U.S. PATENT DOCUMENTS

2009/0196069 A1 * 8/2009 Iwasaki ............... G02B 6/0041
362/613
2015/0248858 A1   9/2015 Ahn
(Continued)

FOREIGN PATENT DOCUMENTS

CN   201106809 Y   8/2008
CN   101382699 A   3/2009
(Continued)

OTHER PUBLICATIONS

Search Report for International Patent Application No. PCT/CN2016/082960 dated Nov. 28, 2016.
First Office Action for Chinese Patent Application No. 201610173896.2 dated May 9, 2018.

*Primary Examiner* — Charles Chang
(74) *Attorney, Agent, or Firm* — Calfee, Halter & Griswold LLP

(57) ABSTRACT

The present disclosure provides a curved-surface backlight source and a display device comprising the curved-surface backlight source. The curved-surface backlight source comprises: a frame, an optical film and a plurality of light source assemblies; the light source assemblies are disposed on the frame, the optical film is disposed on light emergent sides of the light source assemblies, and the light source assemblies and the optical film are in a curved shape.

18 Claims, 2 Drawing Sheets

(52) U.S. Cl.
CPC ............... *G02F 1/133603* (2013.01); *G02F 2001/133612* (2013.01)

(58) Field of Classification Search
USPC .......................................... 349/65
See application file for complete search history.

(56) References Cited

U.S. PATENT DOCUMENTS

| | | |
|---|---|---|
| 2015/0378188 A1 | 12/2015 | Moon et al. |
| 2016/0095205 A1* | 3/2016 | Cho ............... G02F 1/133308 361/749 |
| 2016/0223738 A1 | 8/2016 | Liu et al. |
| 2016/0357066 A1 | 12/2016 | Liu et al. |
| 2017/0235029 A1 | 8/2017 | Diao et al. |

FOREIGN PATENT DOCUMENTS

| | | |
|---|---|---|
| CN | 101666462 A | 3/2010 |
| CN | 203176980 U | 9/2013 |
| CN | 103672745 A | 3/2014 |
| CN | 103824518 A | 5/2014 |
| CN | 104317092 A | 1/2015 |
| CN | 204129250 U | 1/2015 |
| CN | 104503011 A | 4/2015 |
| CN | 104678616 A | 6/2015 |
| CN | 104882070 A | 9/2015 |
| CN | 105242453 A | 1/2016 |
| CN | 105276444 A | 1/2016 |
| JP | 2010140831 A | 6/2010 |
| WO | 2012081504 A1 | 6/2012 |

* cited by examiner

CURVED-SURFACE BACKLIGHT SOURCE AND DISPLAY DEVICE

The present application is the U.S. national phase entry of PCT/CN2016/082960, with an international filing date of May 23, 2016, which claims the benefit of Chinese Patent Application No. 201610173896.2, filed on Mar. 24, 2016, the entire disclosure of which is incorporated herein by reference.

TECHNICAL FIELD

The present disclosure relates to the technical field of display, in particular to a curved-surface backlight source and a display device.

BACKGROUND

Curved-surface liquid crystal display products emerge with the development of display technologies and the rising requirement in terms of user experiences. A curved-surface liquid crystal display panel has certain flexibility, so a curved-surface liquid crystal display effect can be realized. Since liquid crystals do not emit light by themselves, the curved-surface liquid crystal display panel needs to be illuminated by a conventional planar backlight source. Light rays emitted by a planar backlight source has a planar distribution, which cannot exactly match the curved-surface liquid crystal display panel, so when light rays having a planar distribution emitted from the backlight source pass through the curved-surface liquid crystal display panel, the uniformity thereof will be destroyed and the light energy utilization rate thereof is relatively low.

SUMMARY

When the conventional planar backlight source illuminates the curved-surface liquid crystal display panel, luminance uniformity will be affected.

In order to solve the above technical problem, one aspect of the present disclosure provides a curved-surface backlight source, comprising: a frame, an optical film and a plurality of light source assemblies; the light source assemblies are disposed on the frame, the optical film is disposed on light emergent sides of the light source assemblies, and the light source assemblies and the optical film are in a curved shape.

According to one embodiment, the frame, optical film and light source assemblies have the same curvature.

According to one embodiment, the light source assemblies include light guiding bars having a bent column shape, and illuminants disposed at both ends of the light guiding bars.

According to one embodiment, a side of the light guiding bar near the optical film is a light emergent area, and a side of the light guiding bar far away from the optical film is a reflecting area.

According to one embodiment, the light emergent area has a semi-elliptical cross section, and a semi-major axis a of the semi-ellipse satisfies the relation of 4 mm≤a≤8 mm; the reflecting area has a semi-circular cross section, and a radius r of the semi-circle satisfies the relation of 4 mm≤r≤8 mm; the semi-major axis a and the radius r have the same value.

According to one embodiment, the light emergent area is provided with light scattering particles inside or outside a light emergent surface.

According to one embodiment, a light diffusion structure is arranged in the light emergent surface of the light emergent area.

According to one embodiment, the light diffusion structure is a hollow-hole array structure or a prism array structure.

According to one embodiment, a dot structure is arranged in the reflecting area.

According to one embodiment, the light guiding bars are solid cylinders made of PMMA or PC.

According to one embodiment, the illuminants are LEDs or laser light sources.

According to one embodiment, the plurality of light source assemblies are equally spaced on the frame.

According to one embodiment, a distance between adjacent light source assemblies is 10 mm-100 mm.

Another aspect of the present disclosure further provides a display device, which comprises the above-mentioned curved-surface backlight source.

The display device further comprises a curved-surface liquid crystal display panel which has the same curvature as the curved-surface backlight source.

The curved-surface backlight source provided by the embodiments of the present disclosure can form a light emitting curved surface matching the curved-surface liquid crystal display panel so as to ensure uniformity of display, reducing thickness of the whole backlight source and reducing its costs. In addition, the light guiding bars of the curved-surface backlight source use light emergent areas having semi-elliptical cross-sections, so they increase the diffusion angle and improve the light energy utilization rate compared with the existing light guiding bars.

DETAILED DESCRIPTION

Figure 1:
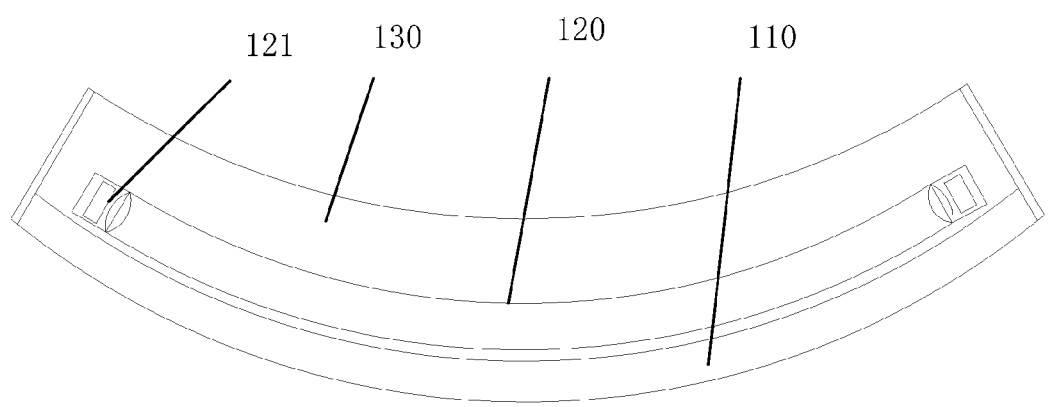
FIG. 1 is a top view of a curved-surface backlight source according to an embodiment of the present disclosure.

In the figures:
110: frame;
120: light source assembly;
121: illuminant;
122: light guiding bar;
123: light emergent area;
124: reflecting area;
130 optical film Embodiments of the present disclosure will now be described in further detail with reference to the accompanying drawings and examples. The following examples are only intended to illustrate the disclosure, but not to limit the scope of the disclosure.

In the description of the present disclosure, it is to be noted that "a plurality of" means two or more unless otherwise specified; the directional or positional relationship indicated by the terms "on", "under", "left", "right", "inside", "outside", "front", "back", "head", "tail", etc. is directional or positional relationship as shown in the drawings, and they are only for facilitating description of the disclosure and simplifying the description, rather than indicating or implying that the device or element referred to must have a specific direction, or be constructed and operated in a particular direction, therefore they cannot be construed as limiting the disclosure.

In addition, the terms "first", "second", "third" and the like are used for descriptive purposes only and are not to be construed as indicating or suggesting relative importance. The terms "install", "connect", "link" should be broadly understood; for example, it may be a fixed connection, or a detachable connection, or an integral connection; it may be a mechanical connection or an electrical connection; it may be a direct connection or an indirect connection through an intermediary. The specific meaning of the above-mentioned terms in the present disclosure will be apparent to those skilled in the art in view of the specific circumstances.

As shown in FIG. 1, the curved-surface backlight source provided in this embodiment comprises a frame 110, an optical film 130, and a plurality of light source assemblies 120. The light source assemblies 120 are disposed on the frame 110, and the optical film 130 is disposed on light emergent sides of the light source assemblies 120. The light source assemblies 120 and the optical film 130 are curved. The light source assemblies 120 may have a curved shape facing the optical film 130. The curved-surface backlight source can be shaped with a curve to match the curved-surface liquid crystal display panel, thus ensuring the display uniformity, reducing the thickness and costs of the backlight source.

The structure of the frame 110 may also be arranged in a curved shape so as to better match the curved-surface liquid crystal display panel. Preferably, the frame 110, the optical film 130 and the light source assemblies 120 are curved to match one another, that is, the frame 110, the optical film 130 can fully fit the light source assemblies 120 such that the frame 110 and the optical film 130 have the same bending curvature as the light source assemblies 120. The curved-surface backlight source can also have the same bending curvature as the curved-surface liquid crystal display panel, such that the curved-surface liquid crystal display panel has high luminance uniformity, and the light energy utilization rate can be fully increased. The curving degrees of the frame 110, the light source assemblies 120, and the optical film 130 depend on the curving degree of the curved-surface liquid crystal display panel. In addition, the frame 110, the light source assemblies 120, and the optical film 130 may be partially curved or completely curved.

Figure 4:
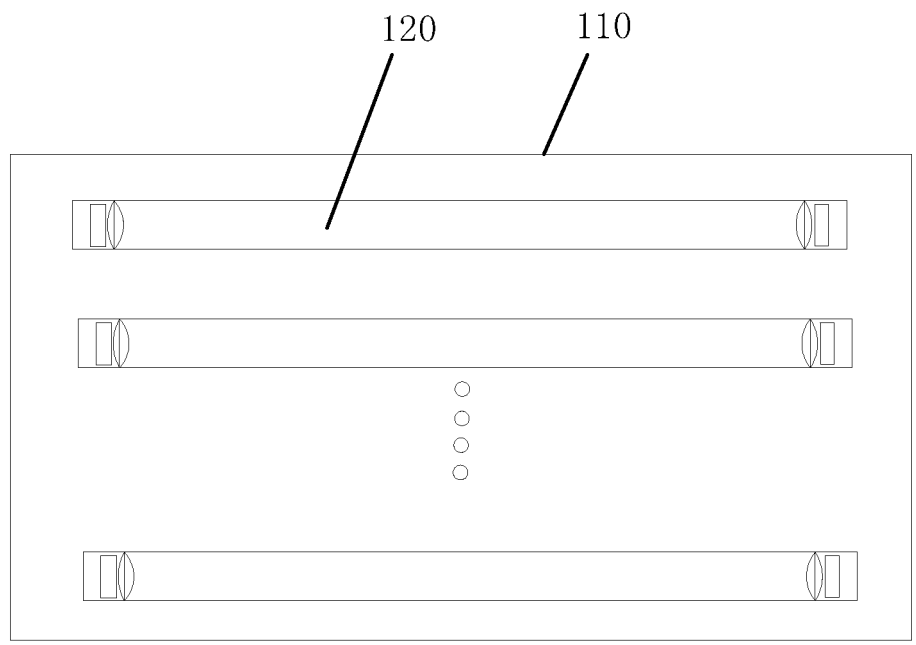
FIG. 4 is a front view of a curved-surface backlight source according to an embodiment of the present disclosure.

The specific size and quantity of the light source assemblies 120 are not limited, but they can be flexibly set according to actual needs. For example, as shown in FIG. 4, a plurality of light source assemblies 120 are equally spaced on the frame 110, and the lengths of the respective light source assemblies 120 are the same. Preferably, the distance between two adjacent light source assemblies is between 10 mm and 100 mm. Of course, the light source assemblies may be set to have other sizes as desired when matching curved-surface liquid crystal display panels of different sizes, which is not limited herein.

Figure 2:
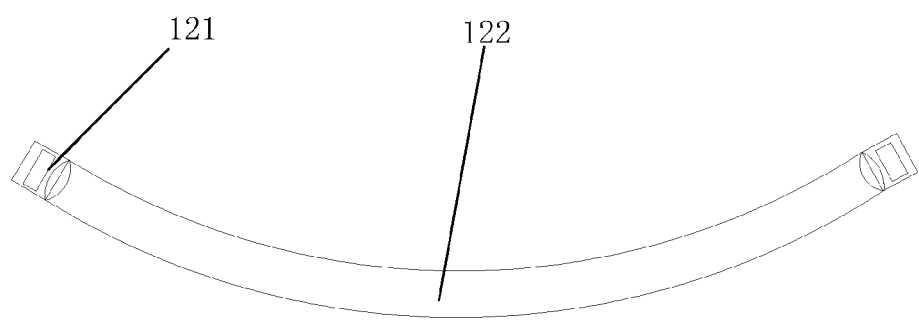
FIG. 2 is a structural diagram of a light source assembly according to an embodiment of the present disclosure.

As shown in FIG. 2, the light source assembly 120 includes a light guiding bar 122 and illuminants 121. The light guiding bar 122 has a bent column shape and is fixed on the frame 110. The illuminants 121 are arranged on both ends of the light guiding bar 122, and central axes of light rays emitted by the illuminants 121 are along a tangential direction of an entrance of the light guiding bar 122.

Figure 3:
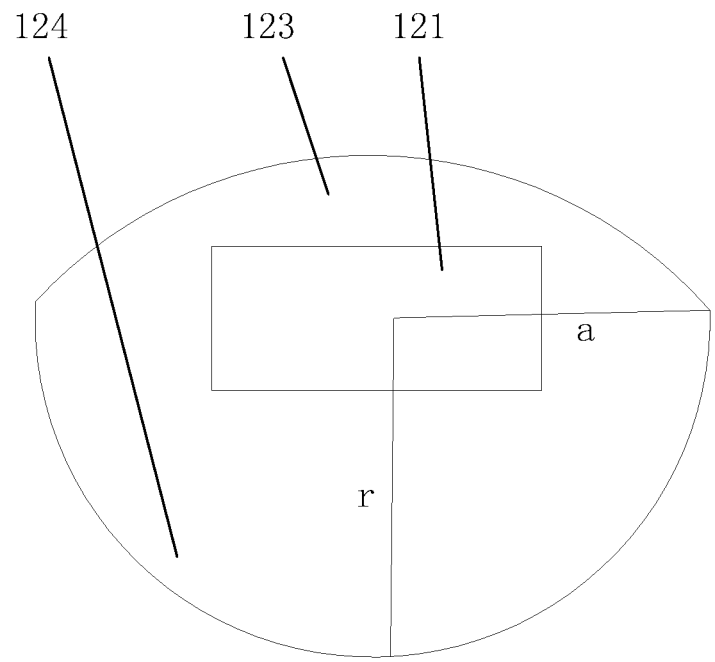
FIG. 3 is a sectional view of a light source assembly according to an embodiment of the present disclosure.

As shown in FIG. 3, the side of the light guiding bar 122 near the optical film is the light emergent area 123 (the upper portion of the sectional view of the light guiding bar 122), and the side of the light guiding bar 122 far away from the optical film is the reflecting area 124 (the lower portion of the sectional view of the light guiding bar 122). This makes it possible to effectively ensure that all the light is emitted from the light emergent area 123.

The light emergent area 123 has a semi-elliptical cross-section to enlarge the diffusion angle and increase the utilization rate of light energy. A semi-major axis of the semi-ellipse is set in a horizontal direction and the semi-major axis a of the semi-ellipse satisfies the relation of 4 mm≤a≤8 mm. The reflecting area 124 has a semicircular cross-section, and the radius r of the semicircle satisfies the relation of 4 mm≤r≤8 mm. The semi-major axis a and the radius r have the same value to ensure that the downward light rays are all emitted from the light emergent area 123 after being reflected. Of course, the semi-major axis a and the radius r are not limited to the above-mentioned range of values, but they can be set flexibly according to the actual needs.

Light scattering particles are provided inside or outside the light emergent surface of the light emergent area 123 so that all the light can be emitted from the light emergent area 123. The light scattering particles include at least one of inorganic particles, organic particles, metal particles, and composite particles, which enable maximum utilization of the light energy and adjustment of the light emergent direction, so that light is emitted vertically from the light emergent surface.

A light diffusion structure may be provided in the light emergent surface of the light emergent area 123. The light diffusion structure may be a hollow-hole array structure or a prism array structure. Cross-sections of prisms in the prism array structure are zigzag or wavy or randomly raised, which is not limited herein.

In order to reduce the loss of light energy in the overlapping portion of the reflecting area 124 and a bottom plate of the frame 110, a dot structure may be provided in the reflecting area 124 to break the total reflection, so that light emitted by the illuminants 121 enter the light guiding bars 122 and are emitted out from the light emergent areas thereof.

The light guiding bar 122 may be a solid cylinder made of PMMA or PC. These two transparent materials are readily available and have high light transmittance. An illuminant 121 is provided at either end of the solid cylinder, and the illuminant 121 can be an LED or a laser light source to provide a stable light source.

It shall be noted that the curved-surface backlight source provided in the present embodiment is a straight down type backlight source, but of course, it can also be flexibly adjusted according to the actual needs.

An embodiment of the present disclosure also provides a display device comprising a curved-surface backlight source.

The curved-surface backlight source comprises a frame 110, an optical film 130, and a plurality of light source assemblies 120. The light source assemblies 120 are disposed on the frame 110, and the optical film 130 is disposed on light emergent sides of the light source assemblies 120. The light source assemblies 120 and the optical film 130 are curved. The light source assemblies 120 may have a curved shape facing the optical film 130. The curved-surface backlight source can be shaped with a curve to match the curved-surface liquid crystal display panel, thus ensuring the display uniformity, reducing the thickness and costs of the backlight source.

In addition, the display device further comprises a curved-surface liquid crystal display panel having the same curvature as the curved-surface backlight source (the curved-surface liquid crystal display panel has the same curving degree as the frame 110, the optical film 130 and the light source assemblies 120), such that the curved-surface liquid crystal display device has high luminance uniformity. As for other structures of the curved-surface backlight source, they have been described in detail above and will not be repeated any more.

The embodiments of the present disclosure are given as examples and for the purpose of description, and they are not intended to be exhaustive or to limit the disclosure to the embodiments disclosed. Many modifications and variations will be apparent to those of ordinary skill in the art. The embodiments are chosen and described in order to better illustrate the principles and practical application of the disclosure and to enable those of ordinary skill in the art to understand the disclosure and thus to design various embodiments with various modifications which are suitable for particular applications.

What is claimed is:

1. A backlight source, comprising: a frame, an optical film and a plurality of light source assemblies, wherein the light source assemblies are on the frame, the optical film is on a light emergent side of the light source assemblies, and the light source assemblies and the optical film are in a curved shape, wherein the light source assemblies include light guiding bars having a bent column shape, and illuminants disposed at both ends of the light guiding bars.

2. The backlight source according to claim 1, wherein the frame, the optical film and the light source assemblies have a same curvature.

3. A display device, comprising the backlight source according to claim 2.

4. The backlight source according to claim 1, wherein a side of the light guiding bar near the optical film is a light emergent area, and a side of the light guiding bar far away from the optical film is a reflecting area.

5. The backlight source according to claim 4, wherein a dot structure is in the reflecting area.

6. A display device, comprising the backlight source according to claim 4.

7. The backlight source according to claim 4, wherein the light emergent area has a semi-elliptical cross section, and a semi-major axis a of the semi-ellipse satisfies the relation of $4\ mm \leq a \leq 8\ mm$;

the reflecting area has a semi-circular cross section, and a radius r of the semi-circle satisfies the relation of $4\ mm \leq r \leq 8\ mm$; the semi-major axis a and the radius r have the same value.

8. A display device, comprising the backlight source according to claim 7.

9. The backlight source according to claim 4, wherein the light emergent area is provided with light scattering particles inside or outside a light emergent surface.

10. The backlight source according to claim 4, wherein a light diffusion structure is on the light emergent surface of the light emergent area.

11. The backlight source according to claim 10, wherein the light diffusion structure is a hollow-hole array structure or a prism array structure.

12. The backlight source according to claim 1, wherein the light guiding bars are solid cylinders made of PMMA or PC.

13. The backlight source according to claim 1, wherein the illuminants are LEDs or laser light sources.

14. The backlight source according to claim 1, wherein the plurality of light source assemblies are equally spaced on the frame.

15. The backlight source according to claim 14, wherein a distance between adjacent light source assemblies is 10 mm-100 mm.

16. A display device, comprising the backlight source according to claim 14.

17. A display device, comprising the backlight source according to claim 1.

18. The display device according to claim 17, further comprising a liquid crystal display panel which has a same curvature as the backlight source.

* * * * *